US006449382B1

(12) United States Patent
Ciccolo et al.

(10) Patent No.: US 6,449,382 B1
(45) Date of Patent: Sep. 10, 2002

(54) METHOD AND SYSTEM FOR RECAPTURING A TRAJECTORY OF AN OBJECT

(75) Inventors: Arthur Charles Ciccolo, Ridgefield, CT (US); Philip C. D. Hobbs, Briarcliff Manor; Howard E. Sachar, Mt. Kisco, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/300,999

(22) Filed: Apr. 28, 1999

(51) Int. Cl.$^7$ ................................................. G06K 9/00
(52) U.S. Cl. ........................................................ 382/103
(58) Field of Search ................................. 382/100, 103, 382/107, 291, 293, 294, 295; 348/169, 25, 48; 396/153; 352/39, 137; 346/516

(56) References Cited

U.S. PATENT DOCUMENTS

| | | | | |
|---|---|---|---|---|
| 4,375,674 A | * | 3/1983 | Thornton | 702/41 |
| 4,545,576 A | * | 10/1985 | Harris | 473/468 |
| 4,965,453 A | * | 10/1990 | Hoschette et al. | 250/349 |
| 5,317,140 A | * | 5/1994 | Dunthorn | 250/221 |
| 5,413,345 A | * | 5/1995 | Nauck | 473/156 |
| 5,768,151 A | * | 6/1998 | Lowy et al. | 463/2 |
| 5,798,942 A | * | 8/1998 | Danchick et al. | 342/96 |
| 5,882,204 A | * | 3/1999 | Iannazo et al. | 434/251 |
| 5,938,545 A | * | 8/1999 | Cooper et al. | 473/407 |
| 6,072,504 A | * | 6/2000 | Segen | 345/474 |
| 6,093,923 A | * | 7/2000 | Vock et al. | 250/206.1 |
| 6,154,250 A | * | 11/2000 | Honey et al. | 348/157 |
| 6,247,259 B1 | * | 6/2001 | Tsadka et al. | 42/103 |

* cited by examiner

Primary Examiner—Andrew W. Johns
Assistant Examiner—Shervin Nakhjavan
(74) Attorney, Agent, or Firm—Stephen C. Kaufman, Esq; McGinn & Gibb, PLLC

(57) ABSTRACT

The present invention is in the field of sensor fusion, and discloses in one embodiment a method for extracting the trajectories of moving objects from an assembly of low-resolution sensors, whose spatial relationships are initially unknown, except that their fields of view are known to overlap so as to form a continuous coverage region, which may be much larger than the field of view of any individual sensor. Segments of object trajectories may be extracted from the data of each sensor, and then stitched together to reconstruct the trajectories of the objects. The stitching process also allows determination of the spatial relationships between the sensors, so that from initially knowing little or nothing about the sensor arrangement or the paths of the objects, both may be reconstructed unambiguously.

22 Claims, 1 Drawing Sheet

METHOD AND SYSTEM FOR RECAPTURING A TRAJECTORY OF AN OBJECT

BACKGROUND OF THE INVENTION

1. Field of the Invention

This invention relates to methodology and system for recapturing a trajectory of an object.

2. Introduction to the Invention

Tracking objects is a common measurement task in situations as different as keeping space probes in a correct orbit, or watching packaged goods go by in a wrapping plant.

There are known tracking systems and methods to do this locally, i.e., with a single sensor such as a video camera/feature extraction system. However, it is significantly harder to extend this methodology across multiple sensors, because of the alignment required. That is, each sensor may do an excellent job of measuring the position and velocity of an object with respect to that sensor's own coordinate system, but relating that coordinate system to those of all the other sensors and to the ordinary Euclidean 4-space of the real world, is a difficult task in general.

There are three basic strategies for handling this task.

The first strategy is to make a single, highly capable sensor that can do all the work itself, e.g., an extremely high resolution IR imaging camera and machine vision processor, or a big Doppler radar. The second strategy is to carefully align several sensors to a known position and orientation, usually using triangulation. The third strategy is to relate each sensor's coordinates to the Euclidean space by calibration, and use a coordinate transformation on each sensor's data individually.

As to this third strategy in particular, we note that calibration and alignment steps are necessary before the data from the sensors can be combined to form an overall measured trajectory for an object. This requirement also places a severe requirement on our knowledge of the geometric imaging properties of the sensors; if the sensor is not a nice regular array of pixels, there is no one combination of rotation and translation that can map one sensor's coordinates into another's. We thus need in principle to know the position of each pixel individually, which is a very stiff constraint, especially since the accuracy requirements of the sensor system may be modest.

SUMMARY OF THE INVENTION

There are many situations in which it would be advantageous to set up a sensor array quickly, without a lot of attention paid to exact alignment and aiming, so that one is able to gather good trajectory information.

This invention discloses methodology suitable for building self-configuring networks of multi-pixel sensors, whose geometric patterns are reasonably well known, but whose positions and orientations may be initially completely unknown except for a constraint of overlapping fields of view.

Looking at this situation in another way, the very fact that objects are moving in a measurement space can give us a way of determining relative coordinate transformations between the coordinate systems of different sensors, provided that the objects cross from one sensor's field of view (FOV) into another's and there is no significant gap between them, at least along the object's trajectories. A significant gap is one large enough for an object's velocity to change sufficiently to make an extrapolation of its position from the time it left one sensor's FOV to the time it enters another, too inaccurate to use. This obviously depends a great deal on the properties of the object and its motion; the maximum acceleration of a supertanker is on the order of $10^4$ cms$^{-2}$; a person walking perhaps 50 cms$^{-2}$; and, an object in a chute, $10^4$ cms$^{-2}$.

Objects whose trajectories cross an overlap region from one FOV into another provide a geometric proof that the corresponding pixels are looking at the same place in Euclidean space, even if it is not known just where that place is, and this can be used to determine the conformation of the sensor FOVs. In order to discuss this clearly, we refer to the partial trajectory data from a single sensor as a sub-trajectory, the final joined-together product in the system's measurement coordinate system as a trajectory sequence.

Provided that the data are synchronized in time to a sufficiently fine accuracy and granularity, and that there are not too many objects in the measurement space, the timing of the crossing, and perhaps comparison of the signatures of the objects in each sub-trajectory, can be used to uniquely assign sub-trajectories to the correct sequence. (By a signature, we mean a constant or slowly varying characteristic of data corresponding to an object that allows it to be distinguished from other objects.) In this way, a group of low data rate, low resolution position sensors can be configured automatically into a system that can track objects globally inside a space.

Accordingly, in a first aspect, the present invention discloses a method for recapturing a trajectory of an object, the method comprising the steps of:

1) employing first and second sensors, respectively capable of gathering information about an object's trajectory within first and second at least partially overlapping fields of view, thereby obtaining a sub-trajectory in each field of view; and 2) stitching the sub-trajectories into a single estimated trajectory.

Step 1) of the method preferably comprises employing first and second multi-pixel infrared sensors.

Preferably, each step 1) sub-trajectory is time stamped, and preferably a time stamp is used for identifying sub-trajectories corresponding to the same object. The method may further comprise a step of using the time stamps for rejecting sub-trajectories which if stitched together would give rise to a discontinuous estimated trajectory.

Step 2) may comprise choosing among sub-trajectories coordinates for stitching based on the sub-trajectories' spatial proximity in the overlap region.

The method may comprise a situation wherein each sub-trajectory is time stamped, and step 2) comprises choosing among sub-trajectories candidates for stitching based on the sub-trajectories' spatial proximity in the overlap region. In this regard, the method may comprise a further step of using the time stamps for rejecting stitching candidates which if stitched together would give rise to a discontinuous estimated trajectory.

The method advantageously further comprises a step of employing a third sensor capable of gathering information about an objects' trajectory within a third field of view overlapping both the first and second fields of view, in which the mutual consistency of two estimated spatial relationships between sensors is improved by adjusting the estimates to reduce the error residuals from pairwise comparison of a trajectory in the overlap regions.

In a second aspect of the present invention, we disclose a method for recapturing a trajectory of an object, the method comprising the steps of:

1) employing first and second sensors, respectively capable of gathering information about an object's trajectory in first and second fields of view, thereby obtaining a subtrajectory in each field of view, and so disposed that a known characteristic of the object's motion places bounds on an error committed in extrapolating its subtrajectories between the edges of the fields of view; and 2) stitching the subtrajectories into a single estimated trajectory.

For the purpose of the second aspect of the invention, techniques for extrapolating include e.g., linear extrapolation along an estimated velocity vector (in Euclidean space) with which the object left one field of view, with error bounds obtained from the known characteristic that the object's acceleration between leaving one field of view and entering the other must be between predetermined bounds.

In a third aspect of the present invention, we disclose a system suitable for recapturing a trajectory of an object, the system comprising:

1) first and second sensors, respectively capable of gathering information about an object's trajectory within first and second at least partially overlapping fields of view, for obtaining a sub-trajectory in each field of view; and 2) means for stitching the sub-trajectories into a single estimated trajectory.

At least one of the first and second sensors preferably comprises a multi-pixel infrared sensor.

In a fourth aspect of the present invention, we disclose a method for determining a spatial relationship between the coordinate systems corresponding to two multi-pixel sensors, whose fields of view are known to overlap at least partially, the method comprising the steps of:

1) gathering sub-trajectory data for an object moving in the fields of view;

2) selecting from the sub-trajectories those which correspond to the object; and 3) computing the spatial relationship from the offsets between the selected sub-trajectories.

It is helpful if each sensor has at most one moving object in its field of view. Preferably, an object has a recognizable signature that can differentiate it from other objects.

Preferably, step 2) includes choosing among only those sub-trajectories whose time extents overlap.

Preferably, step 3) comprises applying a condition that a trajectory of an object is continuous in space and time.

The method advantageously further comprises incorporating a third multi-pixel infrared sensor, in which the mutual consistency of two spatial relationships between sensors may be improved by the imposition of a priori geometrical constraints.

In a fifth aspect of the present invention, we disclose a method for determining a spatial relationship between the coordinate systems corresponding to two multi-pixel sensors, the method comprising the steps of:

1) gathering sub-trajectory data for an object moving in the fields of view of the sensors, where a known characteristic of the object's motion places bounds on an error committed in extrapolating its subtrajectories between the edges of the fields of view;

2) selecting from the sub-trajectories those which correspond to the object;

3) extrapolating the subtrajectories until they overlap in time; and 4) computing the spatial relationship from the offsets between the selected sub-trajectories.

It is helpful if each sensor has at most one moving object in its field of view. Preferably, an object has a recognizable signature that can differentiate it from other objects.

For the purpose of the fifth aspect of the invention, techniques for extrapolating include e.g., linear extrapolation along an estimated velocity vector (in Euclidean space) with which the object left one field of view, with error bounds obtained from the known characteristic that the object's acceleration between leaving one field of view and entering the other must be between predetermined bounds.

In a sixth aspect of the present invention, we disclose a system suitable for determining a spatial relationship between the coordinate systems corresponding to two multi-pixel sensors whose fields of view are known to overlap at least partially, the system comprising:

1) means for gathering sub-trajectory data for an object moving in the fields of view;

2) means for selecting from the sub-trajectories those which correspond to the object; and 3) means for computing the spatial relationship from the offsets between the selected sub-trajectories.

BRIEF DESCRIPTION OF THE DRAWING

The invention is illustrated in the accompanying drawing, in which.

DETAILED DESCRIPTION OF THE INVENTION

Figure 1:
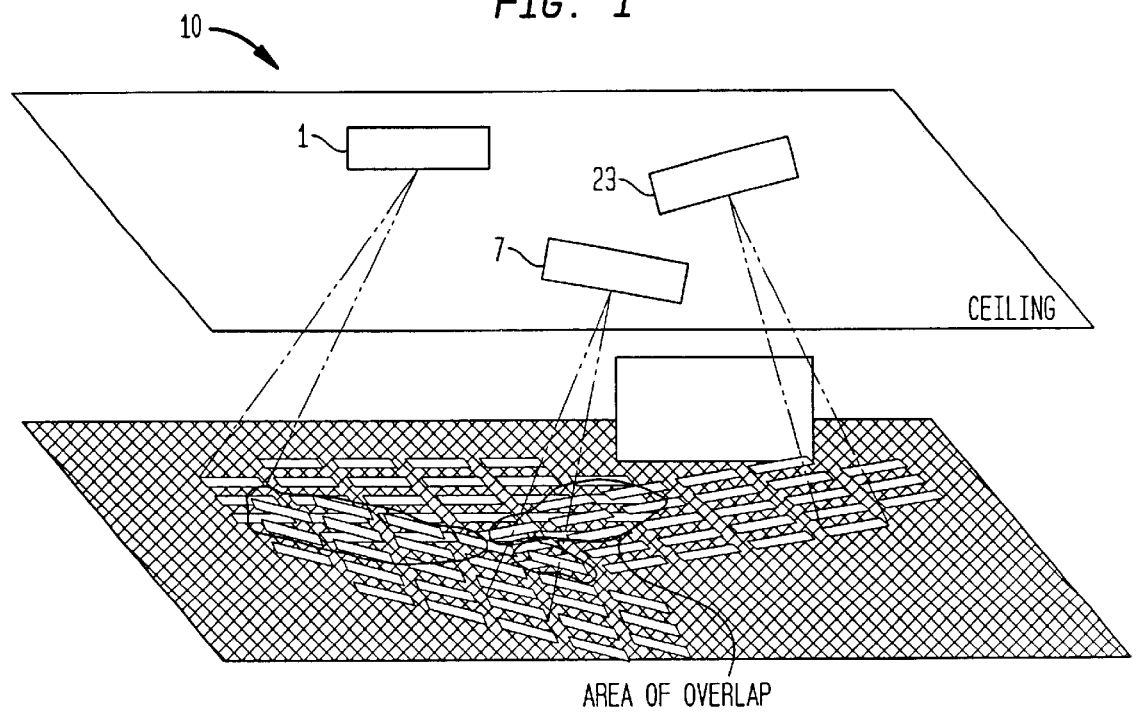
FIG. 1 shows a system that can be used for realizing methodology of the present invention.
Figure 2:
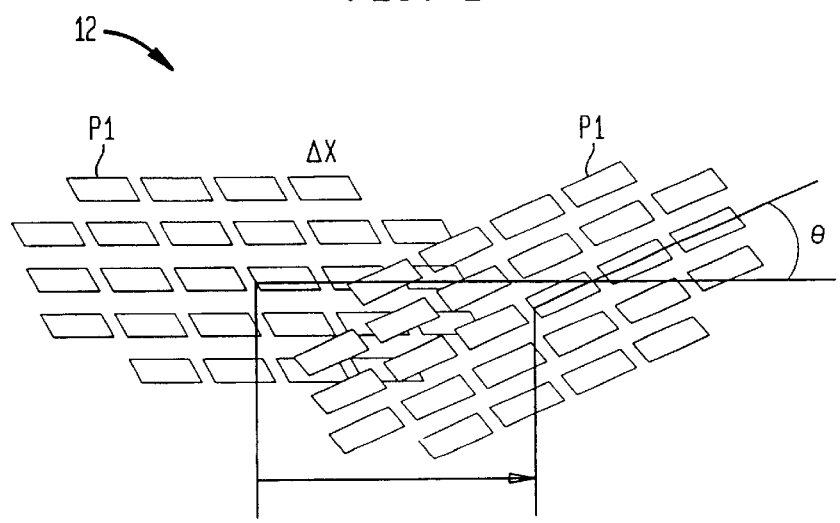
FIG. 2 shows a heuristic sketch useful for demonstrating particulars of the present invention.

The detailed description of the invention proceeds by first disclosing preferred aspects of a system that can realize the invention's methodology, and then disclosing a generalized and a detailed algorithm illustrative of the methodology. To this end, reference may be made to FIGS. 1, 2, numerals 10, 12.

In a preferred embodiment, a system may be assembled using a group of inexpensive, sensitive, battery-powered, multi-pixel pyroelectric infrared sensors. The sensors may be mounted on the ceiling or on hanging light fixtures using magnets, clamps, or Velcro. Alternative sensors can include time-of-flight acoustic or optical rangefinders, video cameras with frame subtraction, or any of these instruments used in combination. Although the types of data from these sensors may be very different, centering on an object's trajectory allows the stitching operation even between sub-trajectories from completely different sensor types.

The sensors can be installed using a spring clip on a pole, like the ones used for changing flood lamps, and need not be particularly accurately aligned. The result is a large array of sensitive areas projected on a floor. Within each sensor, the relative orientation of the pixels should be known quite accurately, but the relationships between the sets of local coordinates in sensor space and between the local coordinates and the Euclidean space in which the objects move are initially unknown. (In talking about a property in sensor space, we mean the property expressed in terms of the relative positions and orientations of the pixels in the sensor itself, whose relationship to the Euclidean space in which the objects move may be complicated and non-unique.)

As objects enter an area, they can trace out continuous trajectories, and be picked up by some of the sensors as they do so. Places where the fields of view of two or more sensors overlap can afford instantaneous and unambiguous relative orientation and position information about the sensors, eventually allowing to be built up a complete knowledge of the relationships between the local coordinate systems in sensor space. Thus, the sensor system can be truly self-configuring, due to the "a priori" overlap and continuity conditions that one can apply to the data set (after performing any extrapolation which may be needed to bridge gaps between the fields of view). This self-configuration need not be done in advance, since the sensors are not moving, so the same data used for configuration can be used for analysis.

In areas where the fields of view do not overlap, there may be enough "a priori" information to piece together partial trajectories into a whole, but this is a significantly more difficult computational problem due to possible ambiguities in real situations; with enough objects and enough gaps, there may be a combinatoric explosion of candidates for matching, making correct matching difficult. Additional "a priori" information can sometimes be supplied to reduce the sensor coverage required. Furthermore, different objects generally have different signatures (in this case related to their surface temperature and emissivity), which can reduce the ambiguity in trajectory reconstruction.

Known constraints of the space under examination can be exploited to reduce the sensor coverage required, and hence the cost and the data rate. For example, in a retail store application, we might want good coverage of checkouts and featured displays, but we already know the altitude of the pedestrians a priori and we probably don't care about monitoring the interior of those displays, or of fitting rooms. In the reconfigurable array, such simple rules allow us to maximize the useful data from a small set of sensors.

Because we are interested in fractional-coverage, low-resolution trajectory data for relatively slow-moving objects, the sensors need not have many pixels, and the sampling rate can be low, perhaps 5 Hz per pixel, leading to a very low overall data rate. The low data rate and low electrical power requirement of the passive pyroelectric sensor means that the sensors can be read out by RF in a round-robin fashion, or can even log the data for readout later. Either alternative allows a very simple network design.

In a preferred embodiment, we assume that sensors 1 . . . N can be arranged on a ceiling somewhere, in some initially unknown spatial configuration, though the spatial pattern of each sensor is known in three dimensions relative to itself (this requirement can be relaxed if the arrangement is constrained, e.g., all sensors are known to be on a planar ceiling and pointed directly downwards). All sensors preferably are started before some time to. Each sensor can produce a time-stamped list of those pixels whose temperatures have changed by more than (say) 3 standard deviations, assumed to be sorted by time and pixel index.

A preferred algorithm's outline is as follows:
1. For each sensor individually, join these isolated events (i.e., measurements of pixels with statistically significant temperature deviations) into a list of sub-trajectories of objects in sensor space, i.e., object position in pixel coordinates as a function of time.
2. To find the spatial relationships between sensors, we use a subset of these data, that is those sub-trajectories during whose course only one object was in the field of view of its sensor, and match the sub-trajectories up with their continuations into neighboring sensors' fields of view. This can be done unambiguously, since at any given time there is at most one candidate trajectory in any of the other sensors' FOVs; so, in the overlap regions, identity of the time stamps, velocities, and IR signatures is expected, within experimental error.

This yields a mapping in a system measurement space, between the individual sensors' pixel positions and the whole measurement system, allowing us to assign any event to a unique position in a single measurement space.

3. Now that we possess this mapping, use it to join the ends of the sub-trajectories together to form complete trajectories of objects in measurement space.
4. Using additional information supplied, e.g., by moving a pulsed IR source such as a flashing bulb around the space, map the measurement space onto the physical space at points of interest, e.g., locations where interesting events are expected to occur (in the retail store case, these might be point-of-sale terminals, advertising displays, video cameras, doors, escalators, and so on).
5. In cases where ambiguity exists, e.g., a reconstructed trajectory that doesn't begin and end at the boundary of the measurement space, or one which crosses a physical area where no sensor is looking, several possibilities exist. The simplest is to discard these, which in most cases, where the information is for statistical purposes, is an acceptable expedient.

Other possibilities include running a global optimization, to minimize some penalty function over the set of all trajectories. For example, one might construct a function that penalizes time spent in a blind zone, compute Euclidean distance between the end points of a missing piece, and reject utterly any proposed trajectory that doesn't reappear in one of the FOVs bordering the blind area.

In most instances, the best thing to do if a significant number of trajectories cross a blind area is to put another sensor there. These sensors are small, cheap, and battery-powered, so that usually isn't a major problem.

Preferred Detailed Algorithm:

In an area A, we have a measurement area A' which is covered by the fields of view of N uniquely identified multi-pixel sensors, each of whose geometric sensitivity patterns is known relative to its own position, but whose spatial relationships (in position and orientation) with other sensors and with points in A is initially unknown.

We obtain from each of sensors 1 . . . N, a time-stamped list of the temperature excursion $\Delta T$ of those pixels whose $\Delta T$ in the corresponding measurement interval exceeded r times the standard deviation. The lists contain data from R well-synchronized measurement epochs t1 . . . tR. The fields of view of the sensors in physical space are assumed to overlap enough that there are only a small number M of blind spots within the coverage area, i.e., areas in A but not in A' that are surrounded on all sides by A'. We proceed as follows:

1. Within each list, and knowing the nearest-neighbor relationships of the pixels in each sensor, use a nearest-neighbor algorithm to connect these events into continuous sub-trajectories that begin and end at the extremity of the sensor's field of view. Each sub-trajectory describes the position of some object within the FOV in sensor coordinates as a function of time.
2. From each list, select isolated sub-trajectories, i.e., those throughout whose duration only one object was in the field of view of that sensor. For each isolated sub-trajectory, traverse the list of isolated sub-trajectories from all other sensors, and select those whose durations contain an endpoint of its own. Rank these candidates by some penalty function that may include how well the ΔTs, the speed, and any changes of direction match between the beginning of the later trajectory and the ending of the earlier one.

3. For each isolated sub-trajectory $''S_j$, look at the best candidate $°C_j^1$ in its list. If $''S_j$ is also the best candidate on the list of $°C_j^1$, then sensors n and the two are neighbors. Compute the planar offsets δx in position and δθ in azimuthal angle between the measurement coordinates of the sensors n and o. For now, we ignore the offsets in z and the pitch and roll angles, which are assumed to be small. The leading-order effect of small offsets near nadir in these coordinates is to move the FOV of the sensors, and that's taken out by the matching operation.

4. Join these two-member lists into a single large list of next-door neighbors. Ensure that there is a continuous chain of spatial relationships covering all N sensors.

5. Use a continuous simulated-annealing algorithm such as AMEBSA from Numerical Recipes to adjust the offsets in 6 dimensions (x, y, z, pitch, roll, and yaw), within a priori known geometric constraints such as ceiling height and slope, to minimize the squared sum of the deviations from simultaneous perfect trajectory matching among the nearest neighbors.

5a. Optionally, use a combinatoric simulated annealing algorithm such as the Metropolis algorithm to extend the optimization over the poorer candidates in each isolated trajectory's list, performing the continuous optimization at each Metropolis step, thus achieving a globally known, consistent mapping between sensor coordinates and an overall measurement coordinate system.

6. Use one or more reference sources, e.g., a pulsed incandescent light carried about on a predetermined schedule, to associate the physical positions where interesting events are expected to occur with the corresponding point in measurement coordinates. Examples of such locations are doors, staircases, escalators, elevators, point-of-sale terminals, video cameras, and advertising displays. Optionally, send the source in a continuous path through the area A', acquiring time-stamped physical space data, to improve the fit of the nearest neighbors by referencing them all to physical coordinates. A single object traversing an otherwise unoccupied A' is adequate for this purpose; it may be possible to watch the person mounting the sensors, for example, or to send someone with a radio-linked Palm Pilot or other handheld communications device, so that he can indicate when he reaches certain positions.

7. Using the global measurement coordinate system, join all sub-trajectories that cross overlap regions between fields of view into complete trajectories that begin and end on the boundary of the region A'.

8. If blind spots exist, and trajectories enter and exit the blind spots, make conjectural connections between them by globally minimizing a penalty function, as before, over all trajectories terminating in that blind spot. Choose the penalty function to emphasize the ΔT signature. (If many trajectories cross blind spots, consider adding additional sensors for next time.) Discard those trajectories crossing blind spots whose penalty functions exceed a certain maximum, and repeat the minimization until all remaining trajectories are adequately matched.

9. If the area A is highly nonconvex, e.g., it is shaped like a letter U, it may be useful to apply the blind-spot step to trajectories that enter the middle of the U. In this case, discard trajectories near the open end of the U that are outward-directed.

What is claimed is:

1. A method for recapturing a trajectory of an object, comprising:

employing first and second sensors, respectively capable of gathering information about an object's trajectory within first and second at least partially overlapping fields of view, thereby obtaining a sub-trajectory in each field of view;

self-configuring said first and second sensors by computing a spatial relationship from the offsets between sub-trajectories; and stitching the sub-trajectories together in sequence to form a single estimated trajectory.

2. A method according to claim 1, wherein said sensors comprise multi-pixel infrared sensors.

3. A method according to claim 1, further comprising:

time stamping each sub-trajectory.

4. A method according to claim 3, further comprising:

using the time stamp for identifying sub-trajectories corresponding to the same object.

5. A method according to claim 3, further comprising:

using the time stamps for rejecting subtrajectories which if stitched together would give rise to a discontinuous estimated trajectory.

6. A method according to claim 1 wherein said stitching comprises choosing among sub-trajectories candidates for stitching, based on the sub-trajectories' spatial proximity in the overlap region.

7. A method according to claim 1, wherein each sub-trajectory is time stamped, and wherein said stitching comprises choosing among sub-trajectories candidates for stitching, based on the sub-trajectories' spatial proximity in the overlap region.

8. A method according to claim 7, further comprising:

using the time stamps for rejecting stitching candidates which, if stitched together, would give rise to a discontinuous estimated trajectory.

9. A method according to claim 1, further comprising:

employing a third sensor capable of gathering information about an object's trajectory within a third field of view overlapping both the first and second fields of view, in which the mutual consistency of two estimated spatial relationships between sensors is improved by adjusting the estimates to reduce the error residuals from pairwise comparison of a trajectory in the overlap regions.

10. The method according to claim 1, wherein said data used for self-configuration of said first and second sensors is used to form said single estimated trajectory.

11. A method for recapturing a trajectory of an object, the method comprising the steps of:

1) employing first and second sensors, respectively capable of gathering information about an object's trajectory in first and second fields of view, thereby obtaining a sub trajectory in each field of view, and so disposed that a known characteristic of the object's motion places bounds on an error committed in extrapolating its subtrajectories between the edges of the fields of view; and 2) stitching the subtrajectories into a single estimated trajectory.

12. A method according to claim 11, comprising the step of extrapolating one or both subtrajectories so that they overlap in time, prior to stitching them together.

13. A system suitable for recapturing a trajectory of an object, the system comprising:

first and second sensors, respectively capable of gathering information about an object's trajectory within first and second at least partially overlapping fields of view, for obtaining a sub-trajectory in each field of view; and means for stitching the sub-trajectories together in sequence to form a single estimated trajectory, wherein said first and second sensors are self-configured by computing a spatial relationship from the offsets between sub-trajectories.

14. A system according to claim 13, wherein at least one of the first and second sensors comprises a multi-pixel infrared sensor.

15. A method for determining a spatial relationship between the coordinate systems corresponding to two multi-pixel sensors, whose fields of view are known to overlap at least partially, the method comprising:

gathering sub-trajectory data for an object moving in the fields of view;

selecting sub-trajectories which in sequence form a trajectory of the object; and computing the spatial relationship from the offsets between the selected sub-trajectories.

16. A method according to claim 15, wherein the object emits a recognizable signature that differentiates it from other objects.

17. A method according to claim 15, wherein said sensor has, at most, one object in its field of view.

18. A method according to claim 15, wherein said selecting comprises choosing among only those sub-trajectories whose time extents overlap.

19. A method according to claim 15, wherein said computing comprises applying the condition that the trajectory of a real object is continuous in time and space.

20. A method according to claim 15, further comprising:

employing a third multi-pixel infrared sensor, in which the mutual consistency of two spatial relationships between sensors is improved by the imposition of a priori geometrical constraints.

21. A method for determining a spatial relationship between the coordinate systems corresponding to two multi-pixel sensors, the method comprising the steps of:

1) gathering sub-trajectory data for an object moving in the fields of view of the sensors, where a known characteristic of the object's motion places bounds on an error committed in extrapolating its subtrajectories between the edges of the fields of view;

2) selecting from the sub-trajectories those which correspond to the object;

3) extrapolating the subtrajectories until they overlap in time; and 4) computing the spatial relationship from the offsets between the selected sub-trajectories.

22. A system suitable for determining a spatial relationship between the coordinate systems corresponding to two multi-pixel sensors whose fields of view are known to overlap at least partially, the system comprising:

means for gathering sub-trajectory data for an object moving in the fields of view;

means for selecting sub-trajectories which in sequence form a trajectory of the object; and means for computing the spatial relationships from the offsets between the selected sub-trajectories.

* * * * *